US008738002B2

(12) United States Patent  (10) Patent No.: US 8,738,002 B2
Yang et al.  (45) Date of Patent: *May 27, 2014

(54) ZONE SWITCHING IN MIXED-ZONE AIR INTERFACE

(75) Inventors: Xiangying Yang, Portland, OR (US); Aran Bergman, Givatayim (IL); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/561,992
(22) Filed: Jul. 30, 2012
(65) Prior Publication Data

US 2012/0302246 A1   Nov. 29, 2012

Related U.S. Application Data

(62) Division of application No. 12/646,284, filed on Dec. 23, 2009, now Pat. No. 8,301,148.
(60) Provisional application No. 61/156,882, filed on Mar. 3, 2009.

(51) Int. Cl.
  *H04W 36/00*  (2009.01)
(52) U.S. Cl.
  USPC ........ 455/438; 455/436; 455/552.1; 370/331; 370/355
(58) Field of Classification Search
  USPC ................. 455/552.1, 436, 439, 443, 432.1; 370/331, 355
  See application file for complete search history.

(56) References Cited

U.S. PATENT DOCUMENTS

| 6,456,858 | B1 | 9/2002 | Streter |
| 7,346,032 | B2 | 3/2008 | Holcman et al. |
| 8,301,148 | B2 * | 10/2012 | Yang et al. ............ 455/438 |
| 2004/0105434 | A1 | 6/2004 | Baw |
| 2005/0037758 | A1 | 2/2005 | Rimoni |
| 2010/0098025 | A1 | 4/2010 | Chen et al. |
| 2010/0227618 | A1 | 9/2010 | Yang et al. |
| 2011/0110329 | A1 | 5/2011 | Yang et al. |

FOREIGN PATENT DOCUMENTS

EP   2337397 A2   6/2011

OTHER PUBLICATIONS

"U.S. Appl. No. 12/646,284, Non Final Office Action mailed Feb. 23, 2012", 9 pgs.
"U.S. Appl. No. 12/646,284, Notice of Allowance mailed Jun. 29, 2012", 7 pgs.
"U.S. Appl. No. 12/646,284, Response filed Jun. 22, 2012 to Non Final Office Action mailed Feb. 23, 2012", 15 pgs.
"U.S. Appl. No. 12/646,284, Restriction Requirement mailed Jan. 12, 2012", 5pgs.
"Part 16: Air interface for Fixed and Mobile Broadband Wireless Access Systems", Draft Amendment to IEEE Standard for Local and Metropolitan Area Networks; IEEE P802.16m/D4, (Feb. 2010), 797 pgs.
Chou, Kelvin, et al., "Comment of the SDD Text on 16e/16in Handover on Zone Switch Operation", IEEE 802.16 Broadband Wireless Access Working Group, (Jan. 5, 2009), 2 pgs.

* cited by examiner

*Primary Examiner* — David Q Nguyen
(74) *Attorney, Agent, or Firm* — Schwegman, Lundberg & Woessner, P.A.

(57) ABSTRACT

Embodiments of a system and method for wireless communication are provided. In certain embodiments, a base station provides a first zone using a first version of the communication standard and a second zone using a second version of the communication standard. In certain embodiments, the base station determines whether a mobile station communicating with the base station in the first zone can support the second version of the communication standard used in the second zone. When the mobile station can support the second version of the communication standard, the base station can send a command to switch the mobile station to the second zone.

15 Claims, 6 Drawing Sheets

ZONE SWITCHING IN MIXED-ZONE AIR INTERFACE

PRIORITY APPLICATIONS

This application is a divisional of U.S. application Ser. No. 12/646,284, filed Dec. 23, 2009, now U.S. Pat. No. 8,301,148 which claims the benefit of priority under 35 U.S.C. 119(e) to U.S. application Ser. No. 61/156,882, filed on Mar. 3, 2009, both of which are incorporated herein by reference in their entirety.

BACKGROUND

On occasion wireless standards are updated for various reasons. Once the update is approved by the reviewing committee, the update is released as new version of the standard. For example, the Institute of Electrical and Electronics Engineers (IEEE) developed the 802.16 standard for wireless broadband communication. The 802.16 standard has released several versions including 802.16e for mobile wireless devices, A future version of 802.16 includes 802.16m having support for higher data rates between a subscriber and a provider device. Another standard that has released several versions includes the Long-Term Evolution (LTE). Each version of LTE is referred to as a release number (e.g., release number 8).

Typically a new version of a standard requires any device conforming to the new version to also be backward compatible and operate on older versions of the standard. Thus, the communication networks can be updated in a piecemeal fashion with devices supporting the new version operating alongside devices that only support the older versions. This allows providers to spread out the cost of updating their network over a period of time. This also allows a user to use an older subscriber device on a network supporting a new version.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The present inventors have recognized, among other things, that a protocol for handoff of a mobile station from a base station supporting only a legacy version of a communication standard (also referred to herein as a "legacy single zone base station") to a base station supporting both the legacy version and a newer version of the communication standard (also referred to herein as an "advanced mixed zone base station") is needed.

Figure 1:
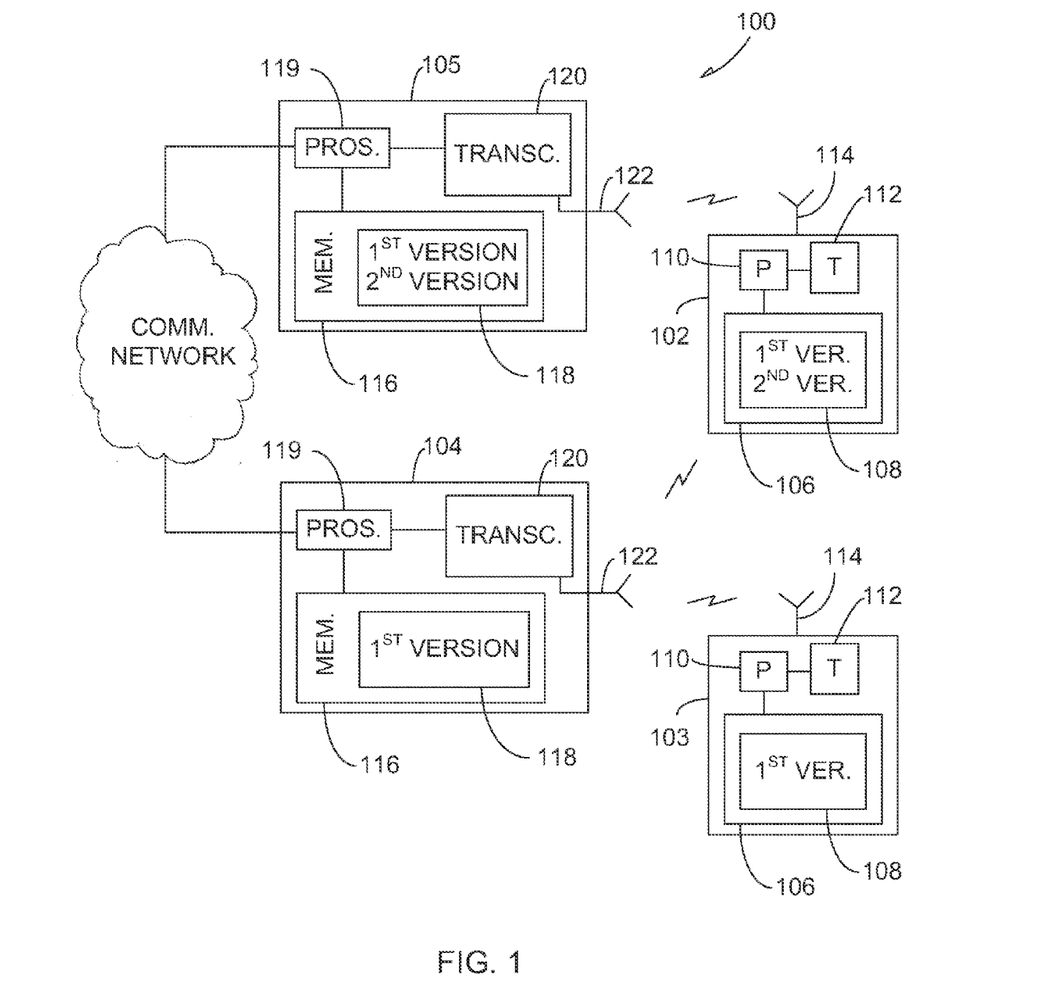
FIG. 1 illustrates an example of a wireless system having a plurality of mobile stations in communication with a mixed zone base station.

FIG. 1 illustrates one example of a wireless communication system 100. The wireless communication system 100 can include a plurality of mobile stations 102, 103 in wireless communication with one or more base stations 104, 105. Each mobile station 102, 103 can include a memory 106 for storage of instructions 108 for execution on processing circuitry 110 of the mobile stations 102, 103. The instructions 108 can comprise software configured to cause the mobile stations 102, 103 to perform actions for wireless communication between the mobile stations 102, 103 and the base stations 104, 105. In an example, the instructions 108 can include instructions for implementing a first version and/or a second version of a communication standard as explained in greater detail below. Each mobile station 102, 103 can also include an RF transceiver 112 for transmission and reception of signals coupled to an antenna 114 for radiation of sensing of signals for the RF transceiver 112.

In an example, the mobile stations 102, 103 can be configured to operate in accordance with one or more frequency bands and/or standards profiles including a Worldwide Interoperability for Microwave Access (WiMAX) standards profile, a WCDMA standards profile, a 3G HSPA standards profile, and a Long Term Evolution (LTE) standards profile. In some examples, the mobile stations 102, 103 can be configured to communicate in accordance with specific communication standards, such as the Institute of Electrical and Electronics Engineers (IEEE) standards. In particular, the mobile stations 102, 103 can be configured to operate in accordance with one or more versions of the IEEE 802.16 communication standard (also referred to herein as the "802.16 standard") for wireless metropolitan area networks (WMANs) including variations and evolutions thereof. For example, the mobile stations 102, 103 can be configured to communicate using the IEEE 802.16-2004, the IEEE 802.16 (e), and/or the 802.16(m) versions of the 802.16 standard. In some examples, the mobile stations 102, 103 can be configured to communicate in accordance with one or more versions of the Universal Terrestrial Radio Access Network (UTRAN) Long Term Evolution (LTE) communication standards, including LTE release 8, LTE release 9, and future releases. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendtnents/versions. For more information with respect to UTRAN LTE standards, see the 3rd Generation Partnership Project (3GPP) standards for UTRAN-LTE, release 8, March 2008, including variations and later versions (releases) thereof.

In some examples, RF transceiver 112 can be configured to communicate orthogonal frequency division multiplexed (OFDM) communication signals which comprise a plurality of orthogonal subcarriers. In some of these multicarrier examples, the mobile stations 102, 103 can be a broadband wireless access (BWA) network communication station, such as a Worldwide Interoperability for Microwave Access (WiMAX) communication station. In other broadband multicarrier examples, the mobile stations 102, 103 can be a 3rd Generation Partnership Project (3GPP) Universal Terrestrial Radio Access Network (UTRAN) Long-Term-Evolution (LTE) communication station. In these broadband multicarrier examples, the mobile stations 102, 103 can be configured to communicate in accordance with an orthogonal frequency division multiple access (OFDMA) technique.

In other examples, the mobile stations 102, 103 can be configured to communicate using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation.

In some examples, the mobile stations 102, 103 can be a personal digital assistant (PDA), a laptop or portable computer wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that can receive and/or transmit information wirelessly.

In an example, the base stations 104, 105 can include a memory 116 for storage of instructions 118 for execution on processing circuitry 119 of the base stations 104, 105. The instructions 118 can comprise software configured to cause the base stations 104, 105 to perform actions for wireless communication with the plurality of mobile stations 102, 103 and for communication with another communication network 124 (e.g. a plain old telephone service (POTS) network). In an example, the instructions 118 can include instructions for implementing a first version and/or a second version of a communication standard as explained in greater detail below. The base stations 104, 105 can also include an RF transceiver 120 for transmission to and from the mobile stations 102, 103 and an antenna 122 communicatively coupled to the RF transceiver 120. In certain examples, the RF transceiver 120 and the antenna 122 can be housed in the same location as the memory 116 and the processing circuitry 119, and in other examples, the RF transceiver 120 (or portions thereof) and/or antenna 122 can be located remotely from the memory 116 and the processing circuitry 119, such as in a distributed base station.

In some examples, the RF transceiver 120 can be configured to communicate OFDM communication signals which comprise a plurality of orthogonal subcarriers, and, in particular, an OFDMA technique. In other examples, the RF transceiver 120 can be configured to communicate using one or more other modulation techniques such as spread spectrum modulation (e.g., DS-CDMA and/or FH-CDMA), TDM modulation, and/or FDM modulation.

In an example, the base stations 104, 105 can be configured to operate in accordance with one or more frequency bands/carriers and/or standards profiles including a WiMAX standards profile, a WCDMA standards profile, a 3G HSPA standards profile, and an LTE standards profile. In some examples, the base stations 104, 105 can be configured to communicate in accordance with specific communication standards, such as the IEEE standards. In particular, the base stations 104, 105 can be configured to operate in accordance with one or more versions of the 802.16 including variations and evolutions thereof. For example, the base stations 104, 105 can be configured to communicate using the IEEE 802.16-2004, the IEEE 802.16(e), and/or the 802.16(m) versions of the 802.16 standard. In some examples, the base stations 104, 105 can be configured to communicate in accordance with one or more versions of the UTRAN LTE communication standards, including LTE release 8 and LTE release 9.

In an example, the base station 104 can communicate with the mobile stations 102, 103 using only a single version of a communication standard (referred to herein as a "single zone base station"). In an example, the base station 105 can communicate with the mobile stations 102, 103 using two or more versions of a communication standard (referred to herein as a "mixed zone base station"). In an example, a mixed zone base station 105 provides first and second zones for communicating with the mobile stations 102, 103. In the first zone, the base station 105 communicates with the mobile stations 102, 103 using a first version of a communication standard. In the second zone, the base station communicates with the mobile stations 102, 103 using a second version of the communication standard. For example, the base station 105 can communicate using the 802.16(e) version of the 802.16 standard in the first zone and the 802.16(m) version in the second zone. The mixed zone base station 104 can communicate concurrently with mobile stations 102 in the first zone and the second zone. That is, in a single communication frame, the mixed zone base station 104 can communicate with both the mobile station 102 in the first zone using the first version of the communication standard and the mobile station 103 in the second zone using the second version of the communication standard.

Figure 2A:
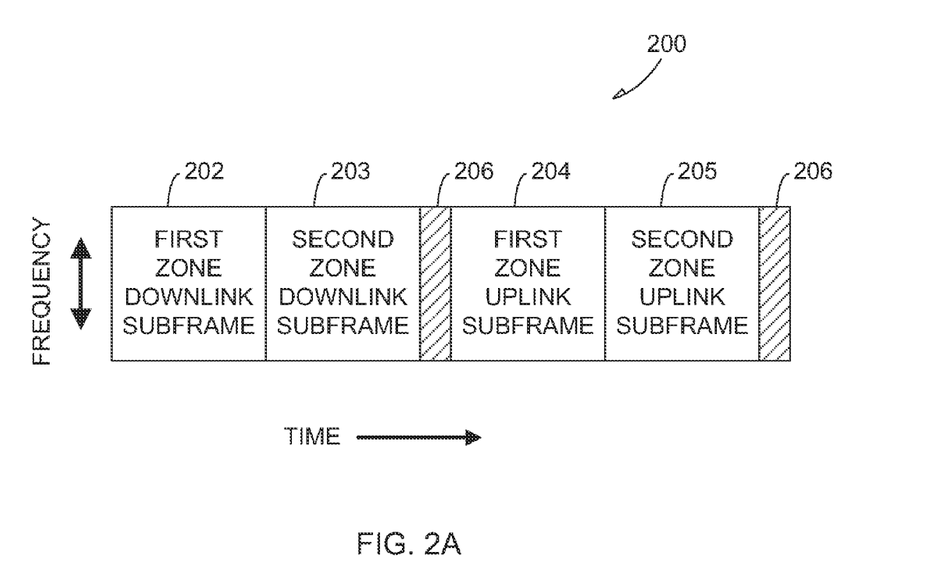
FIGS. 2A and 2B illustrate examples of communication frames for wireless communication between the plurality of mobile stations and a mixed zone base station.
Figure 2B:
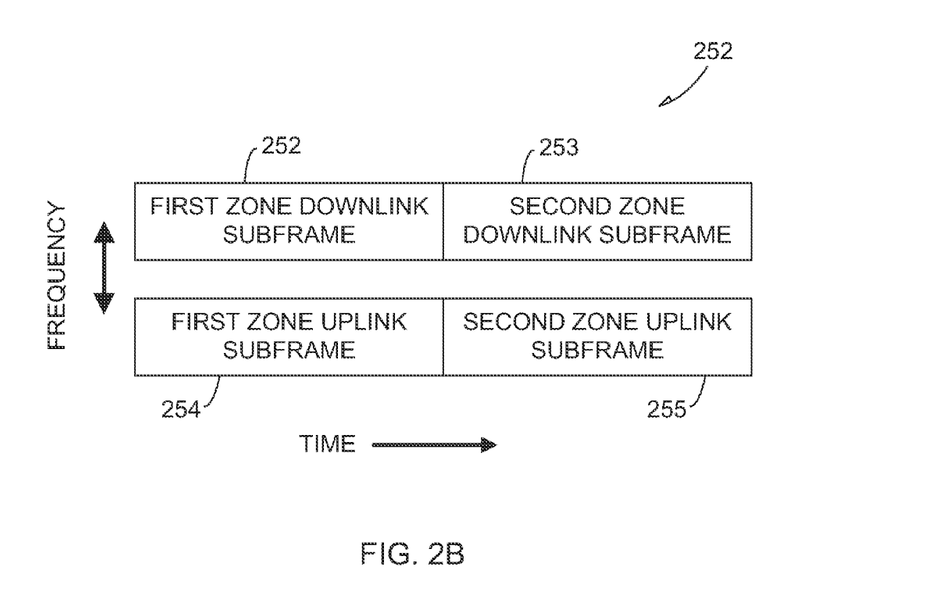

FIGS. 2A and 2B illustrate examples of communication frames 200 and 250 for wireless communication between the plurality of mobile stations 102 and the mixed zone base station 105. The frame 200 illustrates an example frame for a time division duplex (TDD) scheme and frame 250 illustrates an example frame for a frequency division duplex (FDD) scheme.

The TDD frame 200 shown in FIG. 2A includes first and second downlink subframes 202, 203 and first and second uplink subframes 204, 205. The first and second downlink subframes 202, 203, and the first and second uplink subframes 204, 205 are transmitted at separate times over the same frequency range. The first downlink subframe 202 and the first uplink subframe 204 correspond to a first zone of the base station 105, and the second downlink subframe 203 and the second uplink subframe 205 correspond to a second zone of the base station 105. The TDD frame 200 also includes two guard zones 206 between the downlink subframes 203, 204, and the uplink subframes 204, 205. The downlink subframes 202, 203 include signals transmitted by the base station 105 to the mobile stations 102, 103. In other examples, more than two downlink subframes or more than two uplink subframes. The TDD frame 200 can include a plurality of slots and/or sub-channels for assignment to different mobile stations 102, 103 and/or different communication sessions.

In an example, the mobile station 102 is communicating in the first zone and the mobile station 103 is communicating in the second zone. Accordingly, the downlink subframe 202 can include signals transmitted by the base station 105 using the first version of the communication standard and received by the mobile station 102. Likewise, the downlink subframe 203 can include signals transmitted by the base station 105 using the second version of the communication standard and received by the mobile station 103. Similarly, the uplink subframe 204 can include signals transmitted by the mobile station 102 using the first version of the communication standard and the uplink subframe 205 can include signals transmitted by the mobile station 103 using the second version of the communication standard.

The FDD frame 250 shown in FIG. 2B includes a first downlink subframe 252 for communications using a first version of the communication standard and a second downlink subframe 253 for communications using a second version of the communication subframe. The FDD frame 250 also includes a first uplink subframe 254 for communications using a first version of the communication standard and a second uplink subframe 255 for communications using a second version of the communication standard. The first and second downlink subframes 252, 253 are transmitted over a first frequency band/carrier and the first and second subframes 254, 255 are transmitted over a second frequency band/carrier. The downlink subframes 252, 253 are transmitted concurrently with the uplink subframes 254, 255. The FDD frame 500 can include a plurality of slots and/or subchannels for assignment to different mobile stations 102, 103 and/or different communication sessions.

In an example, the downlink subframe 252 can include signals transmitted by the base station 105 using the first version of the communication standard and received by the mobile station 102. Likewise, the downlink subframe 253 can include signals transmitted by the base station 105 using the second version of the communication standard and received by the mobile station 103. Similarly, the uplink subframe 254 can include signals transmitted by the mobile station 102 using the first version of the communication standard and the uplink subframe 255 can include signals transmitted by the mobile station 103 using the second version of the communication standard.

In an example, the mobile station 102 supports both a first version (e.g., 802.16(e)) of a communication standard and a second version (e.g., 802.16(m)) of a communication standard. The mobile station 102 uses the first version of the communication standard when the mobile station 102 is communicating with the single zone base station 104 which supports only a first version of the communication standard. The mobile station 102 also uses the first version of the communication standard when communicating in the first zone of the mixed zone base station 105. The mobile station 102 uses the second version of the communication standard when communicating in the second zone of the mixed zone base station 105.

Figure 3:
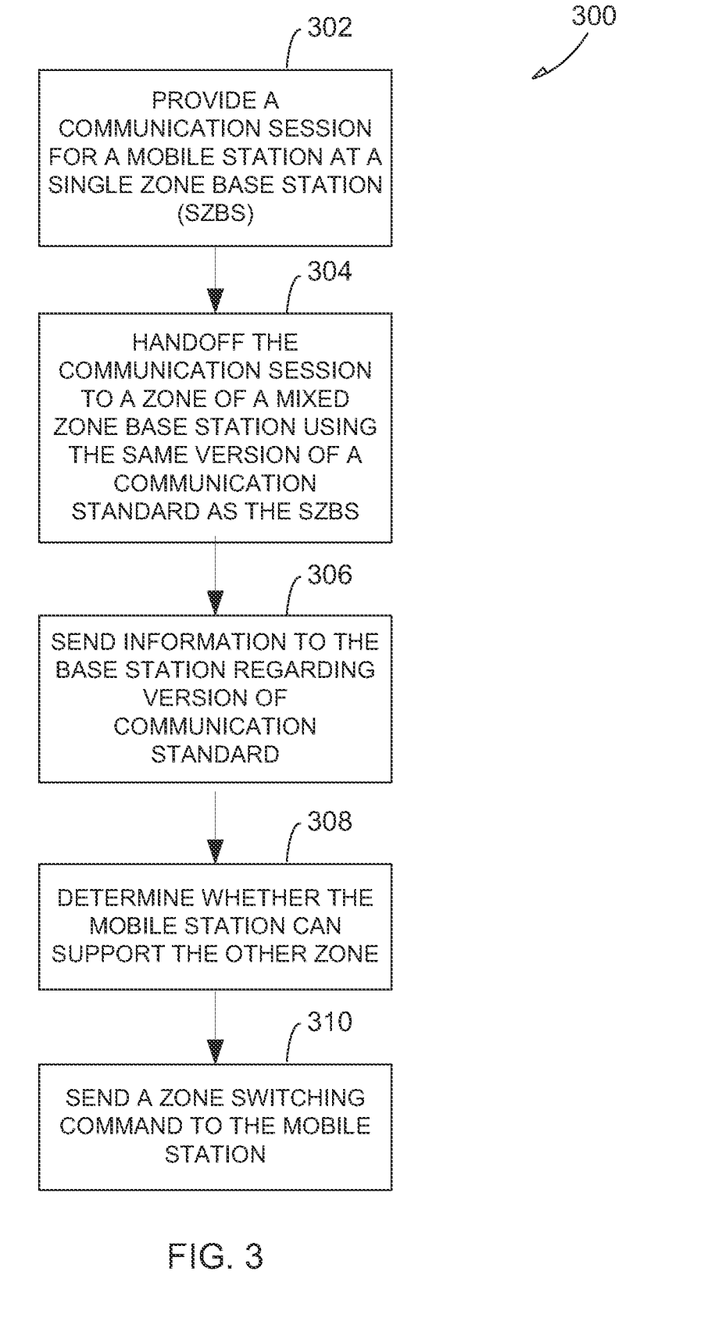
FIG. 3 illustrates an example of a method for wireless communication between a mobile station of FIG. 1 and the base stations of FIG. 1.

FIG. 3 illustrates an example of a method 300 for wireless communication between the mobile station 102 and the base stations 104, 105. In particular, method 300 illustrates an example of a handoff of a communication session for the mobile station 102 from the single zone base station 104 to the mixed zone base station 105.

At block 302, a communication session is provided by the single zone base station 104 for the mobile station 102. In an example, the communication session can include a voice session (e.g., a phone call), and/or a data session (e.g., an interact connection, voice over IP, streaming video). In an example, the communication session can be identified by a connection ID (CID) assigned by the base station 104. In an example, the communication session can include a data plane and a control plane. The data plane comprises the signals having payload data (e.g., the voice signal) for the voice session of data session. In an example, the payload data is routed through the base station 104 to/from the mobile station 102 and another device coupled to the network 124. The control plane comprises the signals having control information (e.g., channel allocations) for the communication session. In an example, the control information is generated by and sent from the base station 104 to the mobile station 102 for maintenance and control of the communication session.

The signals transmitted by the mobile station 102 and the base station 104 for the communication session are transmitted according to the first version of the communication standard.

At block 304, the communication session for the mobile station is handed off from the single zone base station 104 to the mixed zone base station 105. The communication session is handed off from the single zone base station 104 to the zone e.g., the first zone or the second zone) of the mixed zone base station 105 using the same version the first version or the second version) of the communication standard as the single zone base station 104. Thus, in an example, the single zone base station 104 uses the first version of the communication standard, and the communication session is handed off to the first zone of the mixed zone base station 105 which also uses the first version of the communication standard. In an example, the handoff between the single zone base station 104 and the first zone of the mixed zone base station 105 can be performed in the same manner as a handoff between two single zone base stations. That is, the mobile station can enter into the first zone of the mixed zone base station 105 and release the communication session from the single zone base station 104 in the conventional manner of the first version of the communication standard. In an example, the handoff, can be a hard handoff, soft handoff, semi-soft handoff, or other handoff.

During the handoff to the first zone of the mixed zone base station 105, the mixed zone base station 105 sends an assignment of a resource (e.g., a slot in the communication frame) to the mobile station 102 for the communication session being handed over. In an example, the mobile station 102 receives the resource assignment and begins transmitting and receiving data for the communication session using the resource assignment. Additionally, once the communication session has been handed off to the first zone, the mixed zone base station 105 can route data for the communication session to/from the mobile station 102.

At block 306, the mobile station 102 sends the mixed zone base station 105 information indicative of a version of the communication standard supported by the mobile station 102. In an example, the information is sent to the base station 105 during the handoff procedure from the single zone base station 104. In an example, the information can include a media access control (MAC) version (e.g., for a 802.16 communication standard) or a release number (e.g., for an LTE communication standard).

At block 308, the mixed zone base station 105 receives the information and determines whether the mobile station 102 can support the second version of the communication standard. When the mobile station 102 can support the second version of the communication standard, the base station 105 can switch the communication session for the mobile station 102 from the first zone to the second zone. In certain examples, the base station 105 switches the communication session to the second zone soon after determining that the mobile station 102 supports the second version. The switch to the second zone can be made quickly in order to increase the time spent in the second zone. In certain examples, the second version of the communication standard provides benefits over the first version and, therefore, the base station 102 prioritizes communication sessions for the second zone. In certain examples, however, the base station can hold a communication session in the first zone due to load balancing, cooperation with neighboring base stations, or other reasons. When the information received from a mobile station (e.g., mobile station 103) indicates that the mobile station 103 does not support the second version of the communication standard, the base station 105 leaves the communication session for the mobile station 103 in the first zone.

At block 310, the base station 105 sends a zone switching command to the mobile station 102 when the base station 105 decides to switch the communication session for the mobile station 102 to the second zone. The mobile station 102 receives the zone switching command and initiates entry into the second zone in response to the zone switching command. In example, the zone switching command initiates an action time before which the control plane for the communication session is to be released from the first zone. In an example, the action time can include a defined length of time after the zone switching command.

Prior to entry into the second zone, the mobile station 102 obtains system information for the second zone from the base station 105. The system information can include information pertaining to the second zone in general and/or information relating to entry into the second zone. For example, the system information can include the version of the communication standard used by the second zone, the channel/slot layout of the second zone, the ranging channel for the second zone, and other information.

In an example, the mixed zone base station 105 broadcasts the system information for the second zone in a downlink control channel in the second zone. For example, the system information can be broadcast in a super-frame header (SFH) in the 802.16 standard. The mobile station 102 can scan the second zone to receive the system information from the SFH. In another example, the system information for the second zone is broadcast in a downlink control channel for both the first zone and the second zone. That is, the system information for the second zone is broadcast in both zones. Thus, the mobile station 102 can receive the second zone system information directly from the first zone.

In an example, the mobile station 102 receives the system information for the second zone prior to receiving the zone switching command in order to reduce steps for the mobile station 102 during entry into the second zone. In an example, the mobile station 102, the mobile station 102 first determines whether the base station 105 provides a second zone in order to receive the system information prior to receiving the zone switching command. When the system information regarding the second zone is broadcast in the first zone, the mobile station 102 can determine that the second zone is provided and receive the information by receiving information from the downlink control channel for the first zone.

When the system information is not broadcast in the first zone, the mobile station 102 determines that the base station 105 provides the second zone based on information received from the base station 105 indicating a version of the communication standard supported by the base station. In an example, the base station 105 broadcasts information indicative of the versions of the communication standard used by the first zone and the second zone. In an example, the mixed zone base station 105 broadcasts information in each zone regarding both the first zone and the second zone. The information indicates that the first zone uses the first version of the communication standard and that the second zone uses the second communication standard. In an example, the information is broadcast in the downlink control channel for each zone. For example, for a mixed zone base station using the 802.16(e) version of the communication standard in the first zone and the 802.16(m) version of the communication standard in the second zone, the base station can broadcast the MAC version of both the first and second zones in the DCD control message in the first zone and in the SFH control message in the second zone. In an example, therefore, the mobile station 102 receives the MAC version of both the first and second zones from the DCD control message in the first zone when the mobile station 102 enters into the first zone.

In another example, information pertaining to the highest (e.g., most recent) version of the communication standard supported by the base station (e.g., the version used in the second zone) is broadcast in both zones, while lower versions of the communication standard supported (e.g., the version used in the first zone) are not broadcast. In an example, the information can include a media access control (MAC) version supported by the respective zone (e.g., in an 802.16 communication standard) or a release number (e.g., in a LTE communication standard).

In an example, the mobile station 102 receives the information indicative of the one or more versions of the communication standard supported by the mixed zone base station 105 from the downlink control channel in the first zone of the mixed zone base station 105 to obtain the information. Once the mobile station 102 receives the version of the communication standard used by both the first and second zones, the mobile station 102 determines from the received information that the mixed zone base station 105 provides two zones. Once the mobile station has determined that the base station 105 provides a second zone, the mobile station 102 can scan the downlink control channel broadcast in the second zone to obtain the system information carried therein. Accordingly, in an example, the mobile station 102 does not need to obtain the system information after receiving a zone switching command, and can instead use the previously obtained system information to proceed more quickly to entry into the second zone.

Figure 4:
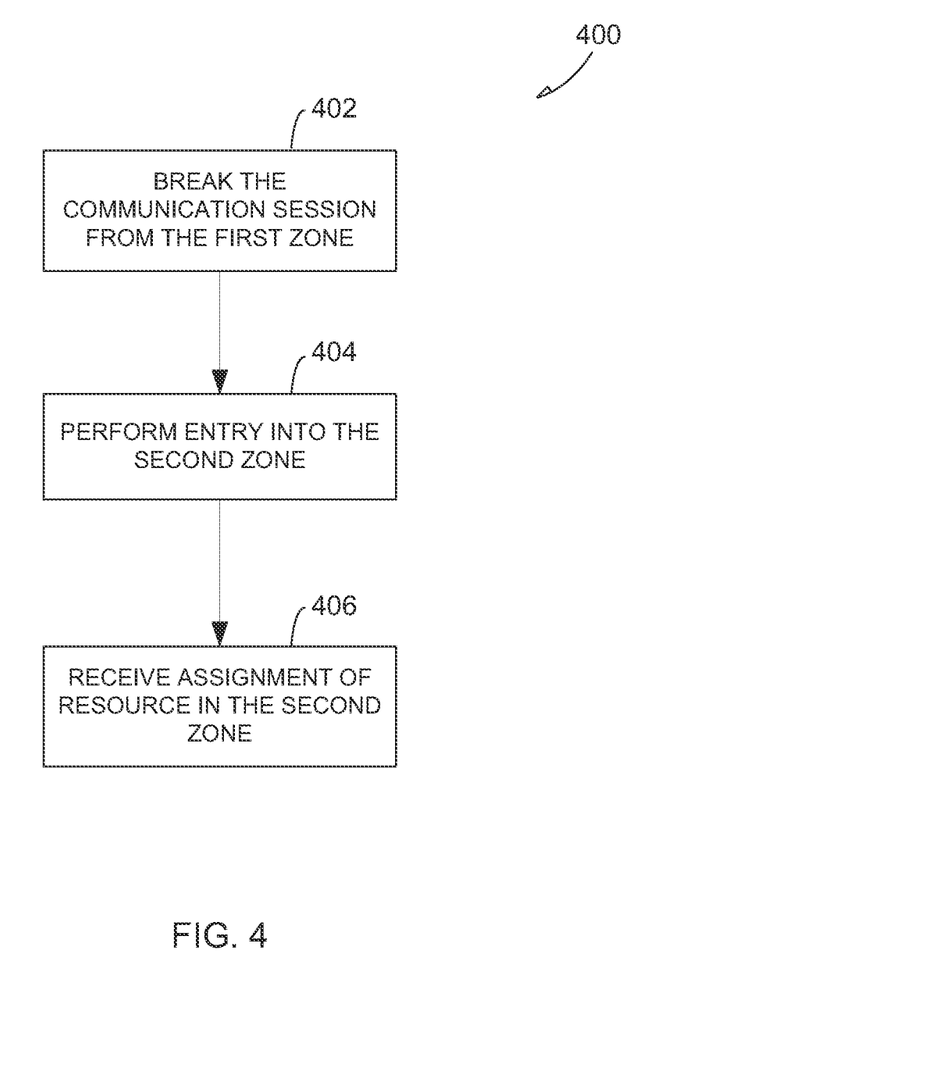
FIG. 4 illustrates an example of a method for basic switching of a communication session from a first zone to a second zone of a base station.
Figure 5:
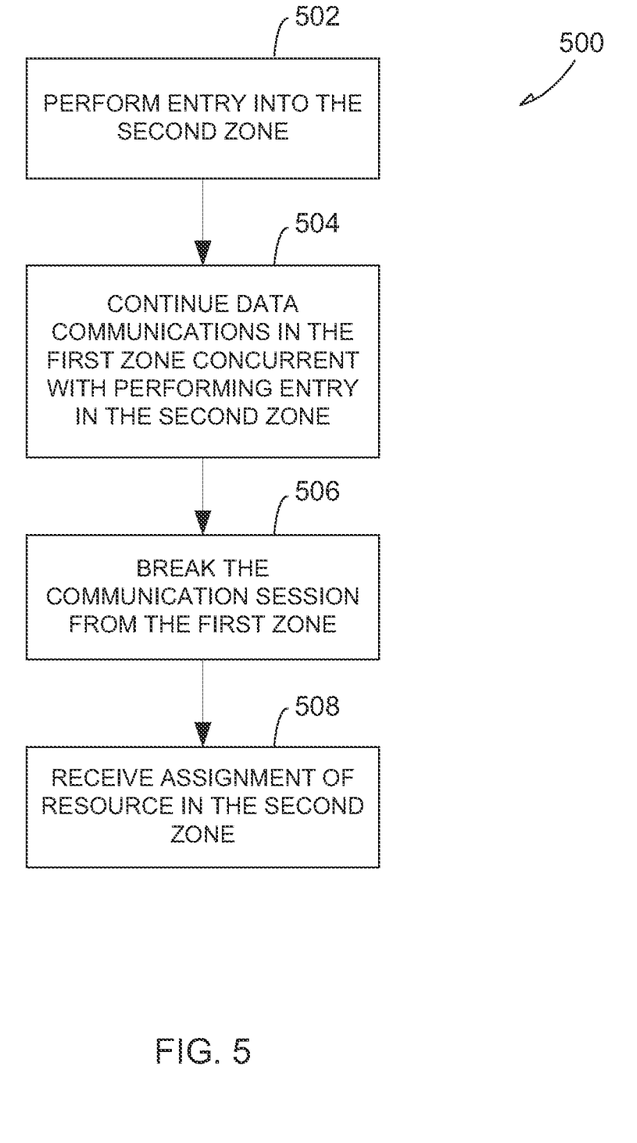
FIG. 5 illustrates an example of a method for seamless zone switching from a first zone to a second zone of a base station.
Figure 6:
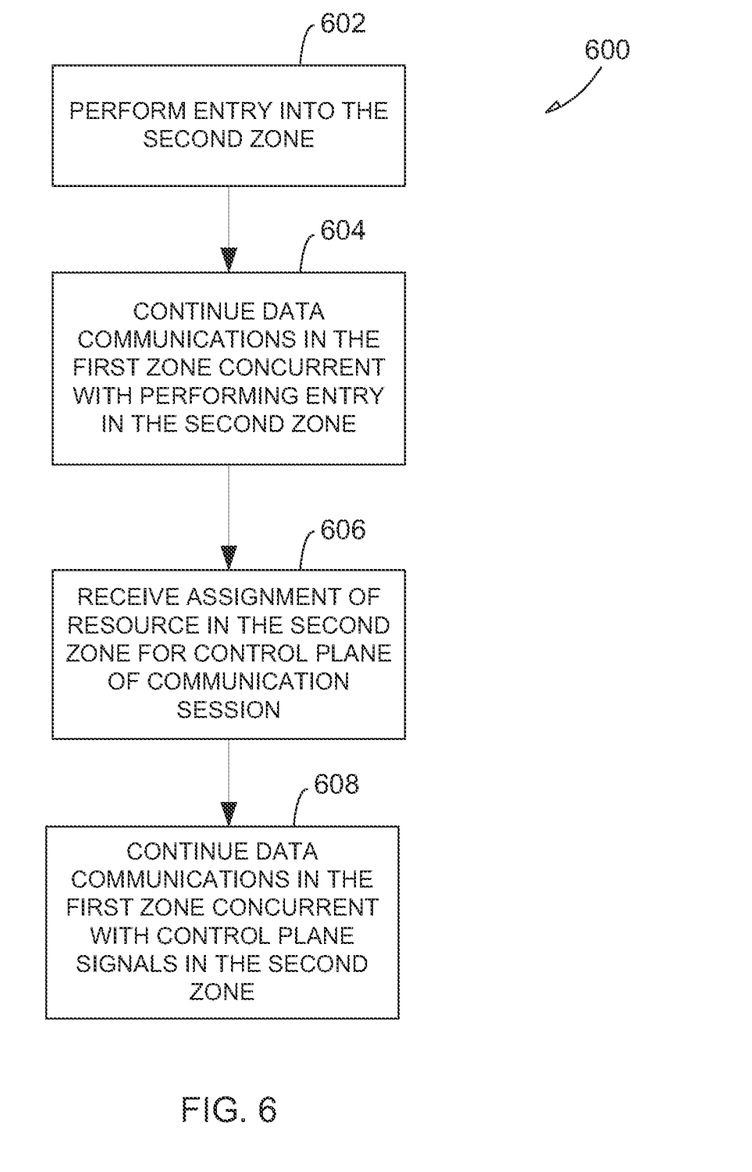
FIG. 6 illustrates an example of a method for hybrid zone switching from a first zone to a second zone of a base station.

In another example, the mixed zone base station 105 sends the system information via a unicast message to the mobile station 102. For example, the mixed zone base station 105 can send the system information with the zone switching command. In another example, the mixed zone base station 105 sends the system information in a separate message to the mobile station 102. In an example, the mobile station 102 can send a request to the base station 105 for entry into the second zone after determining that the base station 105 provides a second zone At 308, the base station 105 and the mobile station switch at least a portion of the communication session from the first zone to the second zone. In an example, the base station 105 determines if the present anchor point for the communication session can support the second version of the communication standard. When the present anchor point cannot support the second version of the communication standard, the base station 105 switches the anchor point to another anchor point that can support the second version of the communication standard. FIGS. 4, 5, and 6 illustrate examples of alternative methods for switching at least a portion of the communication session from the first zone to the second zone.

FIG. 4 illustrates an example of a method 400 for basic switching of the communication session from the first zone to the second zone. At block 402, the communication session is broken from the first zone in response to a zone switching command. To break the communication session from the first zone, the mobile station 102 and the base station 105 release the resource(s) assigned to the communication session in the first zone.

At block 404, after breaking the communication session from the first zone, the mobile station 102 performs entry into the second zone of the base station 105. Entry into the second zone can include ranging if necessary to realign timing, frequency offset, and power characteristics. Entry can also include renegotiation of capability of the mobile station 102.

The physical layer configurations of the mobile station 102 can also be adjusted to operate in the second zone (e.g., MIMO mode, HARQ timing, etc.). Entry can also include updating the security settings when the first zone and the second zone use distinct keys management and hierarchy. In an example, key derivation can be used as the security update method to reduce the airlink overhead/latency involved. Entry can also include remapping of the service flow quality of service (QoS) parameters. In an example, service flow remapping information can be provided to the mobile station 102 in the zone switching command to reduce latency during entry into the second zone. Finally, entry can also include adjustment to other data plane operations (e.g., ARQ stat synchronization, dedicated signaling control channel allocation).

At block 406, a resource from the second zone is assigned to the communication session after entry into the second zone is completed. Once the resource is assigned, data communications for the communication session can be transmitted to/from the mobile station 102 in the second zone. The base station 105 assigns the resource in the second zone to the communication session and routes the payload data for the communication session to/from the mobile station 102 in the second zone using the resource.

Advantageously, the basic zone switching described above with reference to method 400 uses minimal resources and requires minimal complexity of both the mobile station 102 and the base station 105. The basic zone switching described above also frees up channel/slots in the first zone quickly once the zone switching is initiated, by quickly breaking the communication session from the first zone. The basic zone switching, however, can cause an interruption in the communication session while the mobile station 102 is performing entry into the second zone. The interruption is caused due to the gap between when the communication session is broken from the first zone, and when the communication session is assigned resources in the second zone white the mobile station 102 is performing entry into the second zone.

FIG. 5 illustrates an example of a method 500 for seamless zone switching from the first zone to the second zone. Method 500 takes advantage of the fact that both the first zone and the second zone are serviced by the same base station 105 to reduce the possibility of interruption in the communication session. In method 500, data communications for the communication session occur in the first zone concurrently with entry into the second zone. Accordingly, the gap between when the communications session is broken from the first zone and when a resource is assigned to the communication session in the second zone can be reduced.

At block 502, the mobile station 102 performs entry into the second zone in response to receiving a zone switching command (block 306 in FIG. 3). In an example, the entry signals sent and received between the mobile station 102 and the base station 105 can perform similar functions for entry as described above for method 400.

At block 504, data communications for the communication session are continued in the first zone concurrent with the entry signals for entry into the second zone. That is, data communications for the communication session and entry signals for entry into the second zone can occur in the same communications frame.

In an example, the signals for entry into the second zone are transmitted and received in the first zone concurrent with data communications for the communication session in the first zone. In an example, the signals in the first zone for entry into the second zone are sent with formatting according to the first zone and with data contents corresponding to the entry into the second zone. For example, the signals in the first zone can include an existing message format for the first zone with a new message type (not specified in the first zone) that the second version communication standard capable mobile station 102 understands as a second zone entry signal. In an example, the new message type can be identified to the mobile station 102 by modifying the TLV field of the message. In another example, the entry messages can be carried in a generic layer-2 MAC tunnel that is naturally separated from other MAC signaling messages in the first zone. In an example, any updates received by the mobile station 102 specific to the second zone are cached until the mobile station 102 begins transmitting and receiving signals in the second zone. That is, any updates received by the mobile station 102 pertaining to the second zone are not implemented until the mobile station 102 begins transmitting and receiving signals in the second zone. In an example, the zone switching command sets the zone switching action time sufficient for finishing the above operations.

In another example, the signals for entry into the second zone are transmitted and received in the second zone similar to that described in method 400, but the communication session is not broken from the first zone prior to entry into the second zone. Accordingly, data communications for the communication session in the zone occur concurrently with the entry procedure in the second zone. In an example, the mobile station 102 remains awake for the entire frame (e.g., TDD frame 200) and sends/receives communications in both subframes for the first zone and the second zone. In examples where the entry signals are sent and received in the second zone, updates for the mobile station 102 can be implemented immediately for future communications in the second zone.

At block 506, the communication session is broken from the first zone. To break the communication session from the first zone, the mobile station 102 and the base station 105 release the resource(s) assigned to the communication session in the first zone. The break can occur during the entry procedure or after the entry procedure has completed.

At block 508, a resource from the second zone is assigned to the communication session after entry into the second zone is completed. Once the resource has been assigned data communications tier the communication session can be transmitted to/from the mobile station 102 in the second zone. The base station 105 assigns the resource in the second zone to the communication session and routes the payload data for the communication session to/from the mobile station 102 in the second zone using the resource.

FIG. 6 illustrates an example of a method 600 for hybrid zone switching from the first zone to the second zone. In this method the control plane for the communication session is switched to the second zone, and the data plane for the communication session remains in the first zone. In an example, the entry signals sent and received between the mobile station 102 and the base station 105 can perform similar functions to that described above for method 400.

At block 602, the mobile station 102 begins entry into the second zone in response to receiving a zone switching command. In an example, the entry signals sent and received between the mobile station 102 and the base station 105 can perform similar functions to that described above for method 400. Similar to method 500, while the mobile station 102 is performing entry into the second zone, data communications for the communication session can occur concurrently in the first zone. The entry into the second zone can be performed in either the first zone as described with respect to block 502 of method 500, or in the second zone as described with respect to block 404 of method 400.

At block 604, data communications for the communication session are continued in the first zone concurrent with the entry signals for entry into the second zone. That is, data communications for the communication session and entry signals for entry into the second zone can occur in the same communications frame.

At block 606, a resource is assigned from the second zone for the control plane for the communication session after entry into the second zone is complete. At block 608, data communications for the communication session are continued in the first zone concurrent with the control plane signals in the second zone. That is, data communications for the communication session and control plane signals can occur in the same communications frame.

Accordingly, the control plane for the communication session is switched to the second zone while data communications for the data plane occur concurrently in the first zone. In an example, the mobile station 102 monitors the control signals from the base station 105 in the second zone. The control signals can include an SFH message, an advanced MAP, and others. Additionally, the mobile station 102 sends ranging, bandwidth requests, and other control signals in the second zone. Transmission and reception of payload data, however, can occur in the first zone and/or the second zone, based on the scheduling of the base station 105. When signals are sent by the mobile station 102 in the first zone pertaining to the communication session having a control plane in the second zone, the signals have a physical layer structure (e.g., permutation, symbol structure) according to the first zone. In an example, the signals sent in the first zone can trigger lower MAC signaling such as CQI or HARQ feedback. Upper layer MAC context (e.g., RLC/ARQ, security settings, QoS), however, are maintained and updated in the second zone with procedures according to the second zone.

Advantageously, method 600 enables the mobile station 102 to utilize features of the second version of the communication standard in the second zone, while allowing the base station 105 flexibility in assigning and allocating resources to the mobile station 102 in the first zone. This can be particularly advantageous for load balancing between the first zone and the second zone.

In an example, the zone switching methods described herein are used for load balancing between zones within a base station. For example, when a second zone has a load at or near capacity and another mobile station 102 is handed over to the second zone, the method 600 in FIG. 6 can be implemented to provide functionality according to the second zone, while maintaining the data resource allocation in the first zone. Additionally, when one of the zones is at or reaching capacity, the base station 105 can send a zone switching command to a mobile station 102 within the at or near capacity zone to free up some resources in that zone. That is, the zone switching operations can be performed with or without a direct handoff from a neighboring base station.

Embodiments may be implemented in one or a combination of hardware, firmware and software. Embodiments may also be implemented as instructions stored on a computer-readable medium, which may be read and executed by at least one processing circuitry to perform the operations described herein. A computer-readable medium may include any mechanism for storing in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for controlling a zone switch of a mobile station communicating with a mixed zone base station, the method comprising:
providing a communication session for a mobile station in a first zone of the mixed zone base station having multiple zones, wherein communications in the first zone use a first version of a communication standard;
receiving information regarding one of the first version and a second version of the communication standard that the mobile station supports, the first version of the communication standard and the second version of the communication standard being from a common standards family;
determining whether the mobile station is capable of communicating in a second zone of the mixed zone base station based on the information received from the mobile station, wherein communications in the second zone use the second version of the communication standard; and
switching at least a portion of the communication session to the second zone when the mobile station is capable of communicating in the second zone.

2. The method of claim 1, comprising:
receiving a handoff of the mobile station to the first zone from another base station.

3. The method of claim 1, comprising:
broadcasting one of a media access control (MAC) version and a release number for use in the second zone of the mixed zone base station having multiple zones.

4. The method of claim 1, comprising:
breaking the communication session from the first zone;
receiving entry signals from the mobile station in the second zone after breaking the communication session from the first zone;
transmitting a message to the mobile station in the second zone for entry of the mobile station into the second zone; and
wherein switching at least a portion of the communication session to the second zone includes switching after completion of entry of the mobile station into the second zone.

5. The method of claim 1, comprising:
performing entry of the mobile station into the second zone;
transmitting signals to the mobile station in the first zone for the communication session concurrent with performing entry of the mobile station in the second zone;
breaking the communication session from the first zone after completion of at least a portion of entering into the second zone; and
wherein switching at least a portion of the communication session to the second zone includes switching after completion of entry of the mobile station into the second zone.

6. The method of claim 5, wherein performing entry of the mobile station into the second zone includes:
transmitting signals in the first zone having a message type corresponding to the second zone; and
receiving signals in the first zone having a message type corresponding to the second zone.

7. The method of claim 1, comprising:
performing entry of the mobile station into the second zone;
switching a control plane for the communication session to the second zone; and
transmitting data communications to the mobile station corresponding to the communication session in the first zone concurrently with transmitting control communications for the communication session in the second zone.

8. A multi-zone base station for providing wireless communication with a plurality of mobile stations, the multi-zone base station comprising:
a radio frequency (RF) transceiver for transmitting to and receiving signals from a plurality of mobile stations; and
processing circuitry communicatively coupled to the multi-zone base station, the processing circuitry configured to:
provide a first zone of the multi-zone base station that uses a first version of a communication standard;
provide a second zone of the multi-zone base station that uses a second version of the communication standard, the first version of the communication standard and the second version of the communication standard being from a common standards family;
send data communications for a communication session to a mobile station in the first zone;
receive information from the mobile station regarding one of the first version and the second version of the communication standard that the mobile station supports; and
determine whether the mobile station is capable of communicating in the second zone based on the information received from the mobile station; and switch at least a portion of the communication session to the second zone when the mobile station is capable of communicating in the second zone.

9. The multi-zone base station of claim 8, wherein the processing circuitry is configured to:
broadcast one of media access control (MAC) version and a release number for use in the second zone of the multi-zone base station.

10. The multi-zone base station of claim 8, wherein the processing circuitry is configured to:
break the communication session for the mobile station from the first zone;
receive signals from the mobile station for entry of the mobile station into the second zone after breaking the communication session from the first zone;
send a message to the mobile station in the second zone for entry of the mobile station into the second zone; and
switch the at least a portion of the communication session to the second zone after completion of entry of the mobile station into the second zone.

11. The multi-zone base station of claim 8, wherein the processing circuitry is configured to:
send a zone switching command to the mobile station;
perform entry of the mobile station into the second zone;
send data communications for the communication session while concurrently performing entry of the mobile station in the second zone;
break the communication session from the first zone after completion of at least a portion of entry into the second zone; and
switch the at least a portion of the communication session to the second zone after completion of entry of the mobile station into the second zone.

12. The multi-zone base station of claim 8, wherein the processing circuitry is configured to:
perform entry of the mobile station into the second zone;
switch a control plane for the communication session of the mobile station to the second zone; and
send data communications for the communication session to the mobile station in the first zone concurrently with sending control communications for the communication session in the second zone.

13. A method for controlling a zone switch of a mobile station communicating with a mixed zone base station, the method comprising:
providing a communication session for a mobile station in a first zone of the mixed zone base station, wherein communications in the first zone use a first version of a communication standard;
receiving information regarding one of the first version and a second version of the communication standard that the mobile station supports;
determining whether the mobile station is capable of communicating in a second zone based on the information received from the mobile station, wherein communications in the second zone use a second version of the communication standard;
performing entry of the mobile station into the second zone, wherein performing entry of the mobile station into the second zone includes:
transmitting signals in the first zone having a message type corresponding to the second zone; and
receiving signals in the first zone having a message type corresponding to the second zone;
transmitting signals to the mobile station in the first zone for the communication session concurrent with performing entry of the mobile station in the second zone;
breaking the communication session from the first zone after completion of at least a portion of entering into the second zone; and
switching at least a portion of the communication session to the second zone when the mobile station is capable of communicating in the second zone, wherein switching at least a portion of the communication session to the second zone includes switching after completion of entry of the mobile station into the second zone.

14. The method of claim 13, comprising:
receiving a handoff of the mobile station to the first zone from another base station.

15. The method of claim 13, comprising:
broadcasting one of a media access control (MAC) version and a release number for use in the second zone of the mixed zone base station.

* * * * *